United States Patent
Nannapaneni et al.

(10) Patent No.: US 11,513,742 B2
(45) Date of Patent: Nov. 29, 2022

(54) DISTRIBUTED HOT SPACE IN A DATA STORAGE SERVER

(71) Applicant: EMC IP Holding Company LLC, Hopkinton, MA (US)

(72) Inventors: Rajasekhar Nannapaneni, Bangalore (IN); Ganesh Chichakar, Mumbai (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/128,765

(22) Filed: Dec. 21, 2020

(65) Prior Publication Data

US 2022/0197570 A1 Jun. 23, 2022

(51) Int. Cl.
*G06F 3/00* (2006.01)
*G06F 3/06* (2006.01)

(52) U.S. Cl.
CPC .......... *G06F 3/0689* (2013.01); *G06F 3/0604* (2013.01); *G06F 3/0629* (2013.01); *G06F 3/0664* (2013.01)

(58) Field of Classification Search
None
See application file for complete search history.

(56) References Cited

U.S. PATENT DOCUMENTS 9,823,866 B1 * 11/2017 Radovanovic .......... G06F 3/067

* cited by examiner

*Primary Examiner* — Midys Rojas
(74) *Attorney, Agent, or Firm* — Amin, Turocy & Watson, LLP

(57) ABSTRACT

The described technology is generally directed towards a virtualized dedicated hot spare storage device in a RAID-configured data storage system, in which the capacity of the dedicated spare storage device is distributed among the physical disks underlying a RAID virtual disk. A RAID controller creates a first virtual construct comprising an array of logical block addresses that maps data reads from and writes to the virtual disk to locations in the physical disks underlying the virtual disk. When hot space storage device capacity is specified, the RAID controller creates a second construct comprising another array of logical block addresses which are reserved for the distributed hot space. The virtualized dedicated hot spare storage device increases storage capacity and performance by utilizing more of the storage resources of a data storage server.

20 Claims, 12 Drawing Sheets

DISTRIBUTED HOT SPACE IN A DATA STORAGE SERVER

TECHNICAL FIELD

The subject application relates generally to data storage, and, for example, to a technology that distributes spare storage space among storage devices configured as a virtual disk, and related embodiments.

BACKGROUND

Contemporary server RAID (redundant array of independent disks) controllers allow multiple different RAID types such as RAID 0, RAID 1, RAID 5, RAID 10 and so on. A customer can create one or more virtual storage devices (e.g., virtual disks or virtual solid state drives) on un-configured drives using any of the available RAID types.

To provide for additional fault tolerance, a customer can specify that a hot spare storage device be created on a drive in a data storage server for redundancy. When a physical drive that is used in a redundant virtual disk fails, the hot spare drive is activated to replace the failed physical disk without interrupting the system or requiring human intervention. The hot spare can be either global or dedicated; a global hot spare can provide fault tolerance for one or more virtual disks (provided the disk drives or solid state drives are generally of the same size, form factor and speed), whereas a dedicated spare is dedicated to a virtual disk and gets activated only when that virtual disk has a disk failure in one of the physical disks underlying that virtual disk.

However, when dedicating a storage device as a hot spare drive, the hot spare drive remains idle until needed, that is, until another physical drive fails. While idle, the unused hot spare drive still consumes physical slot space in the server, wastes power, and generates heat that contributes to the overall temperature of the datacenter. For servers having an even number of drive slots configured with one of the mirrored types of RAID (such as RAID 10) that needs even number of disks, the use of a single hot spare drive reduces the total number of possible physical drives underlying the virtual drive by two, because there cannot cause be an odd number of physical drives in a mirrored virtual disk. In other words, when creating a mirror-type virtual disk, using a single dedicated hot spare drive causes the number of other un-configured drives to be odd, and thus one more drive needs to be left out to keep the number of physical drives an even number.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
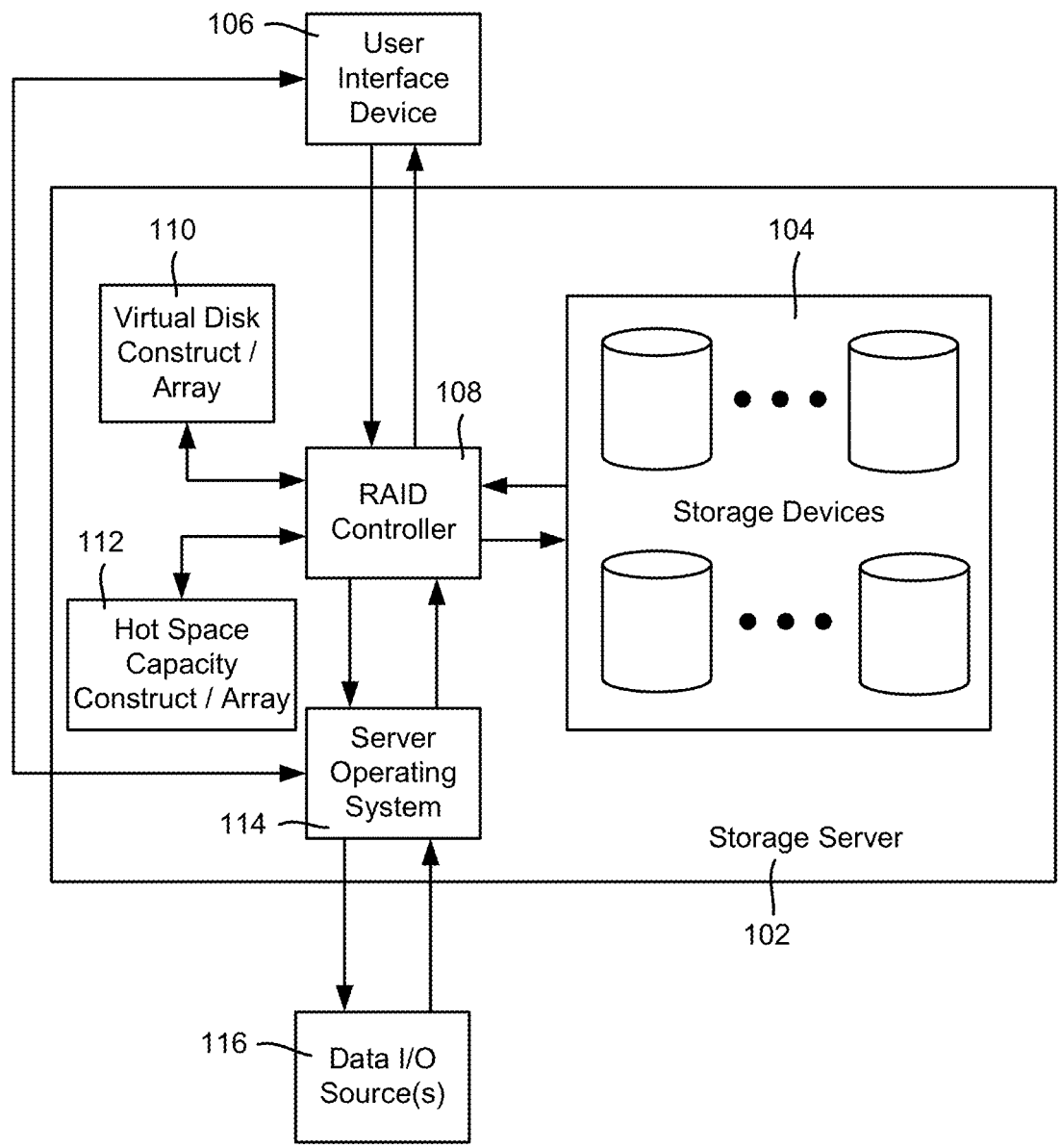
FIG. 1 is a block diagram representation of example components of a data storage server configured with distributed dedicated hot space, in accordance with various aspects and implementations of the subject disclosure

Various aspects of the technology described herein are generally directed towards distributing the storage capacity of a dedicated hot spare drive among the physical storage devices (disk drives or solid state drives) underlying a virtual drive in a server. As will be understood, this provides more optimal usage of datacenter resources, including improved storage device utilization, improved performance, reduced power consumption and the like.

In one aspect, the technology described herein allows a dedicated hot spare storage device to be utilized as part of a virtual storage device configuration, in which the "drive" reserved for the hot spare drive is included in a virtual disk. The capacity specified for the hot spare can be equally distributed on the underlying disks used by the virtual disk. When so configured, the RAID controller can present the virtual disk to the server as one block of contiguous logical block addresses (LBAs). A first virtual construct comprises a first array of logical LBAs; the RAID controller maps these logical LBAs to the physical LBAs on each of the physical drives underlying the virtual disk. A second virtual construct comprising a second array of logical LBAs maps to the physical LBAs for the hot spare capacity.

Thus, via a distributed hot space in which the distributed hot space capacity is used instead of a physical hot spare drive, hot space capacity is virtually distributed on the underlying drives of a virtual drive, and no physical drive is idle. This facilitates the utilization of the other drive for production (data writes and reads) which otherwise would be idle, and thus provides more optimal utilization of capacity and performance with respect to disk usage in servers. Further, for servers with an even number of drive slots, the distributed hot space functionality avoids "odd number of drive" scenarios that result in an unused drive when using a mirrored type of RAID. Still further, the distributed hot space technology described herein provides increased capacity for a virtual drive relative to existing dedicated hot spare configurations.

In the event of a failed drive, each of the underlying physical drives can participate in reconstructing the failed drive's data for storing on a replacement drive, thereby providing a reduction in rebuild time while retaining performance during failed disk scenarios. In other words, by distributing hot space capacity on the underlying physical disks of the virtual disk, rebuild performance is improved by simultaneous rebuilds on various spindles rather than on a single dedicated hot spare spindle as in prior systems. This significantly reduces the rebuild time while retaining the performance of the virtual disk in a disk failure scenario.

It should be understood that any of the examples herein are non-limiting. For instance, some of the examples refer to a RAID 10 single virtual drive configuration among twenty-four physical solid state drives in a server, while another example refers to a server in which twelve front drives, four internal drives and four rear drives are present, and used with one RAID 10 virtual disk configuration and another RAID5 virtual disk configuration; however it us understood that the technology can provide benefits and advantages with numerous other configurations and types, and thus these are only some examples. Further, it should be noted that the terms "storage device," "hard disk," "hard drive" and "solid state drive" are used interchangeably herein, as are "virtual disk" "virtual storage device" "virtual drive" and the like. Thus, any of the embodiments, aspects, concepts, structures, functionalities or examples described herein are non-limiting, and the technology may be used in various ways that provide benefits and advantages in computing and data storage in general.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows a data storage server 102 containing a number of physical storage devices 104 such as hard disk drives and/or solid state drives. An example of one such server is a DELL POWEREDGE R740xd server model.

Figure 6:
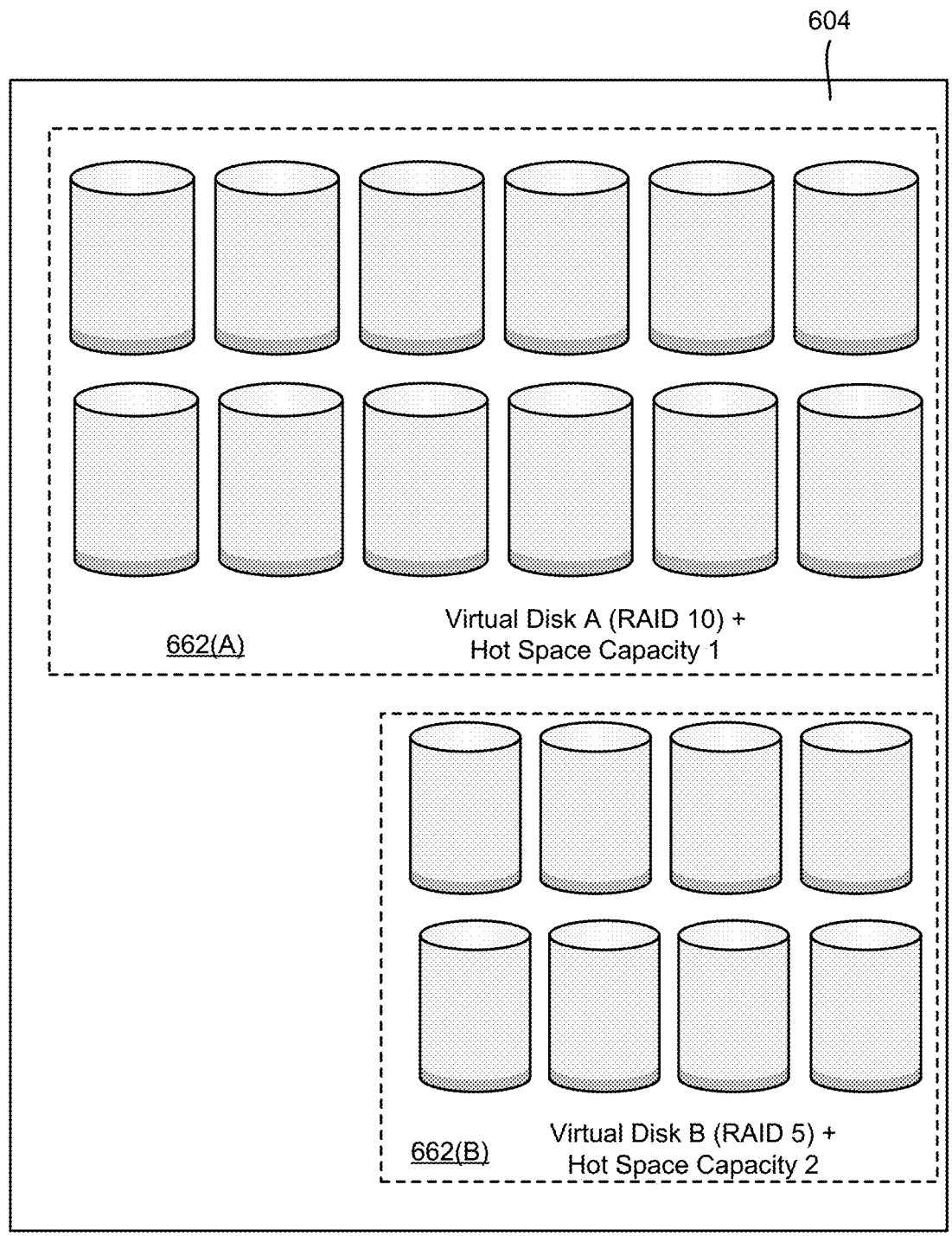
FIG. 6 is a representation of a server's physical storage devices underlying a RAID 10 virtual drive configuration with distributed hot space capacity, and a RAID 5 virtual drive configuration with distributed hot space capacity, in accordance with various aspects and implementations of the subject disclosure.

As described herein, an administrator/customer or the like interacts via a user interface device 106 to configure the storage devices 104, via a RAID controller 108 (e.g., a hardware device, but alternatively implemented in software), as a virtual disk with a specified RAID type; note that more than one virtual disk and/or RAID type may be configured on a single server model, (as exemplified with reference to FIG. 6, for example). Further, in this example the administrator/customer reserves dedicated hot space capacity for the virtual disk(s).

As further described herein, when dedicated hot space capacity is specified, the RAID controller creates following two virtual constructs, which in one implementation each comprise an array of logical block addresses (LBAs). A first construct 110 comprises a first array of LBAs which are used for writing/reading the actual virtual disk data to the underlying physical disks. A second construct 112 comprises a second array of LBAs which are reserved for distributed hot space. In this way, the RAID controller 108 maps logical LBAs from the first construct 110 to definite portions of the physical LBAs on each of the physical storage devices 104, generally such that the definite amount of LBAs on each physical disk are generally equally used for writing data. In a similar fashion the second construct 112 maps other definite portions of the physical LBAs on each of the physical storage devices 104 for the distributed hot space.

Once configured as a virtual disk, the RAID controller 108 presents the virtual disk (e.g., to a server operating system 114) as one block of contiguous LBAs. Data input output (I/O) source(s) 116 can then write to and read from the virtual disk configured on the underlying physical storage devices 104.

It should be noted that FIG. 1 is only one example of a server configuration. Some alternative examples include having a software RAID controller implemented as part of the operating system, an external computer (or group of computers) with a software or hardware RAID controller that couples to a group of data storage devices, an external hardware RAID controller, and so on.

Figure 2:
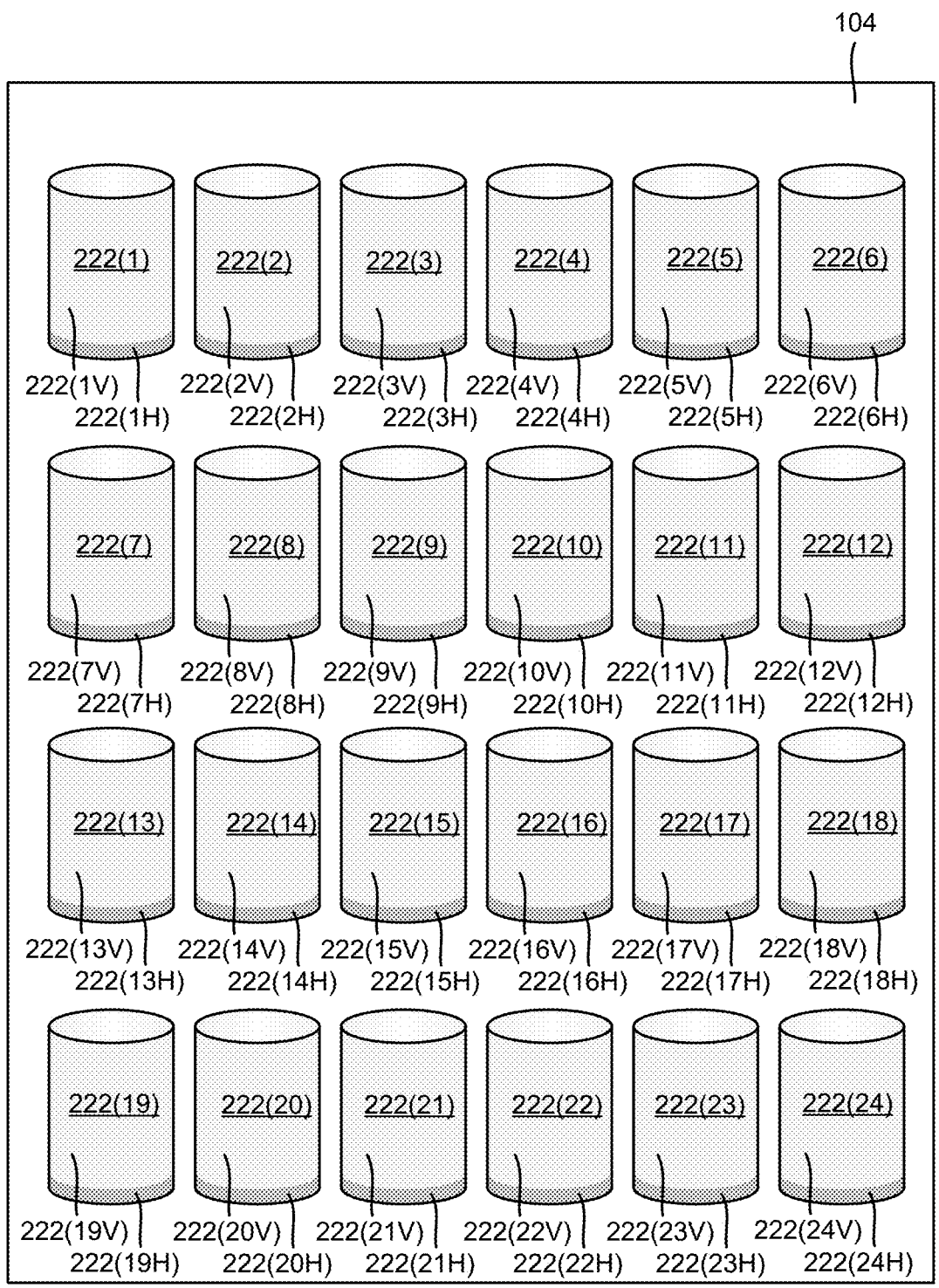
FIG. 2 is a representation of physical storage devices underlying a RAID 10 virtual drive configuration with distributed hot space capacity, in accordance with various aspects and implementations of the subject disclosure.

By way of a more particular example as shown in FIG. 2, consider a server model of storage devices 104 with up to a twenty-four 2.5 inch drive configuration, with each of the drives 222(1)-224(24) being a 6.4 terabyte non-volatile memory express solid state (NVMe SSD) drive, providing a total physical capacity of 153.6 terabytes (TB). In this example, the customer specifies a single virtual disk RAID 10 configuration with virtualized hot space corresponding to one dedicated hot spare drive.

Note that in prior systems with one (actual physical) hot spare drive reserved and RAID 10 mirroring, only twenty-two of the drives (e.g., 222(1)-224(22)) are able to be used for the virtual drive, with one drive (e.g., 224(24)) being used for the hot spare drive and one drive present but unused or one drive slot left empty. The maximum capacity of such a virtual disk is 70.4 TB, that is, the virtual disk is spread across twenty-two drives (22×6.4 TB=140.8 TB/2 for mirroring=70.4 TB), with the capacity of the hot spare being 6.4 TB.

In contrast, as represented in FIG. 2, the technology described herein distributes the hot space capacity (6.4 TB corresponding to one hot spare drive) among the twenty-four drives 222(1)-224(24), as shown in FIG. 2 via the darker shaded portions 222(1H)-224(24H) (not intended to be to scale). The rest of the capacity, shown in FIG. 2 via the lighter shaded portions 222(1V)-224(24V), is used for the virtual disk. Thus, there is increased virtual drive capacity relative to the prior system; more particularly, $^{23}/_{24}$ of each of the twenty-four physical drives 222(1)-224(24) is used for the virtual disk, that is, ($^{23}/_{24}\times24\times6.4$ TB=147.2 TB/2 for mirroring=73.6 TB), while the other $^{1}/_{24}$ capacity is used for the virtualized hot space capacity ($^{1}/_{24}\times24\times6.4$ TB=6.4 TB). Not only is virtual disk capacity increased, but all twenty-four drives are used, resulting in more efficient I/O operations.

Figure 3:
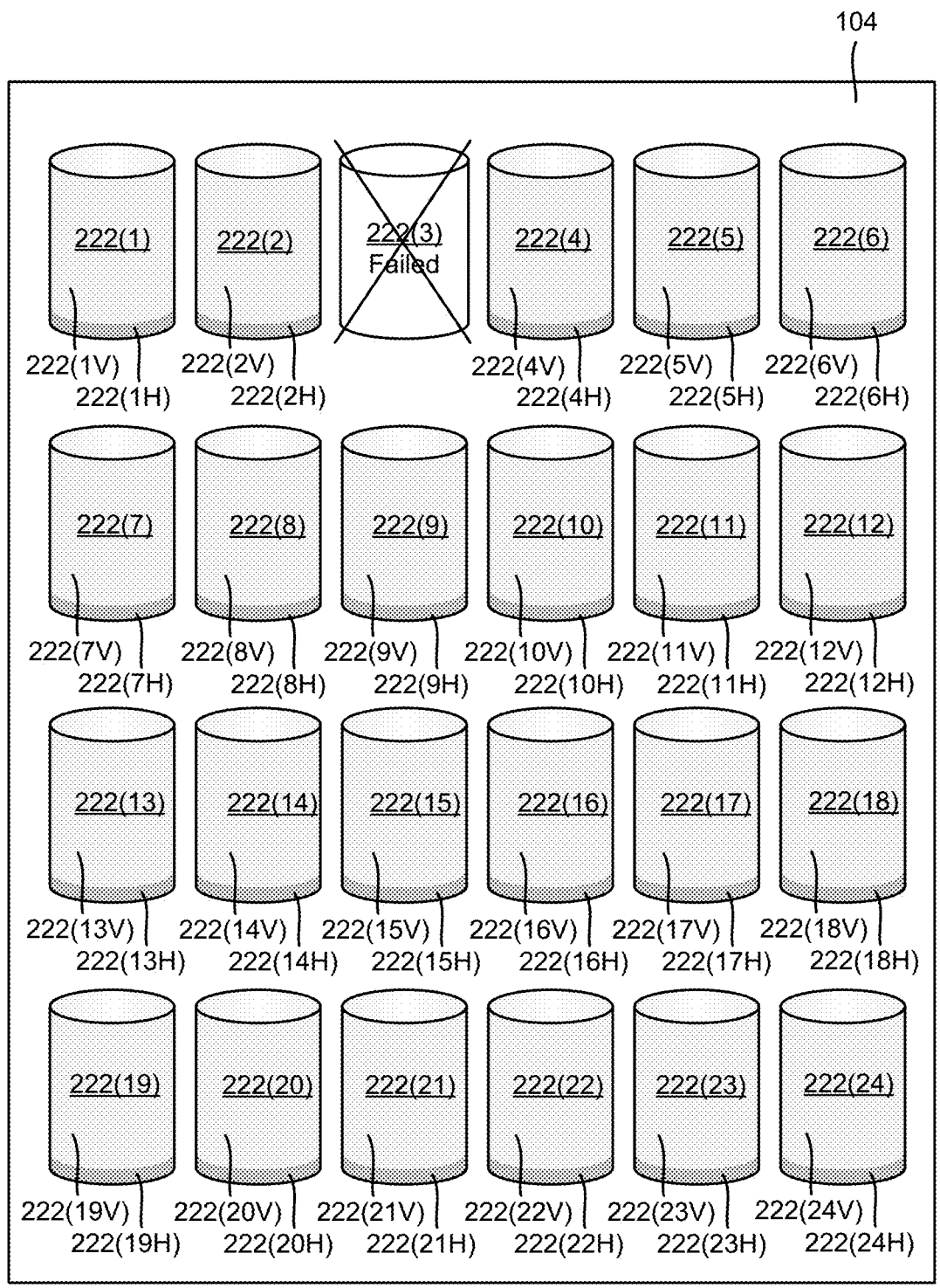
FIGS. 3-5 are representations of physical storage devices underlying a RAID 10 virtual drive configuration with distributed hot space capacity, representing when a storage device failure occurs (FIGS. 3 and 4) and the failed storage device is replaced with a replacement storage device (FIG. 5), in accordance with various aspects and implementations of the subject disclosure.
Figure 4:
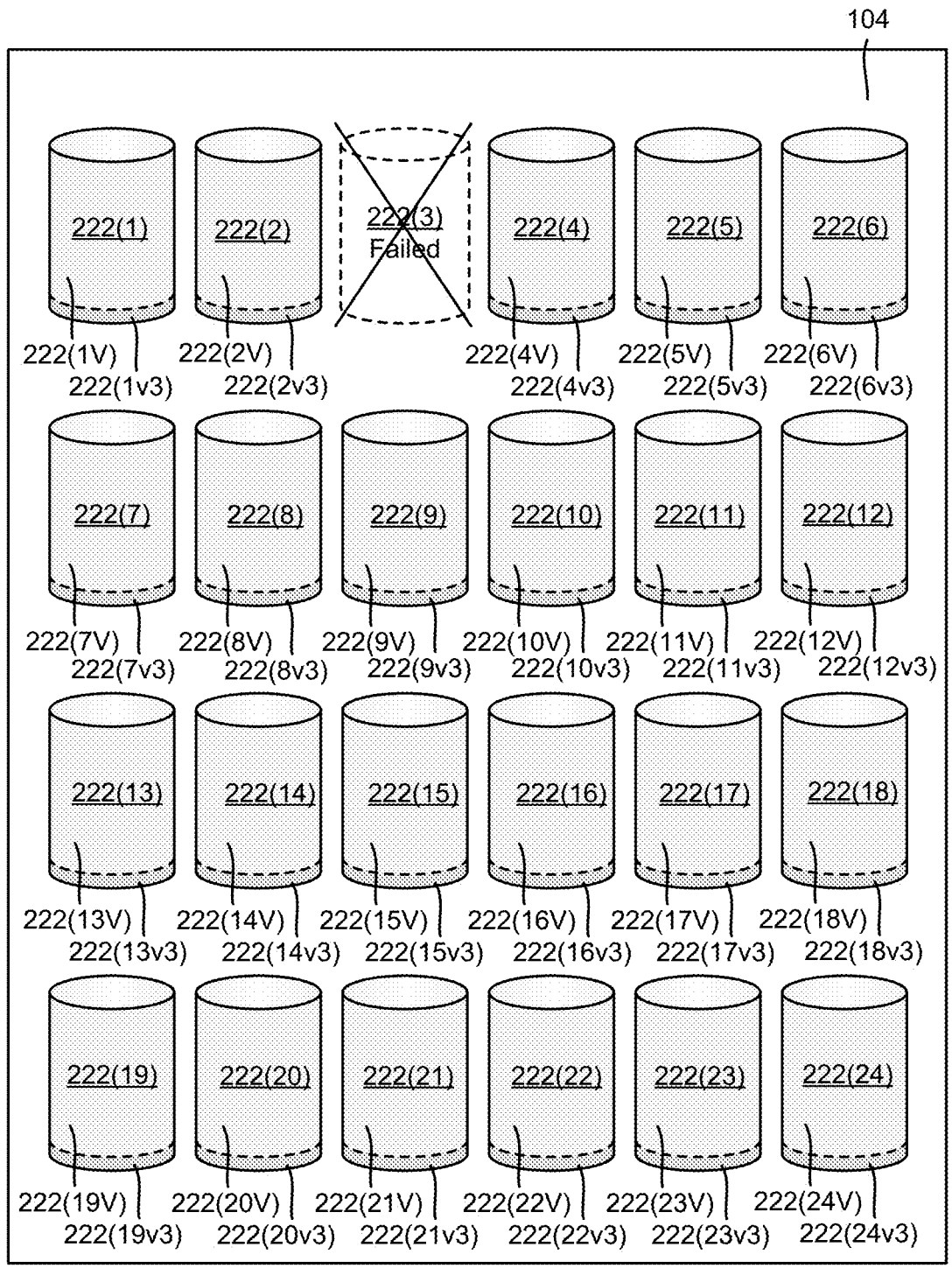
Figure 5:
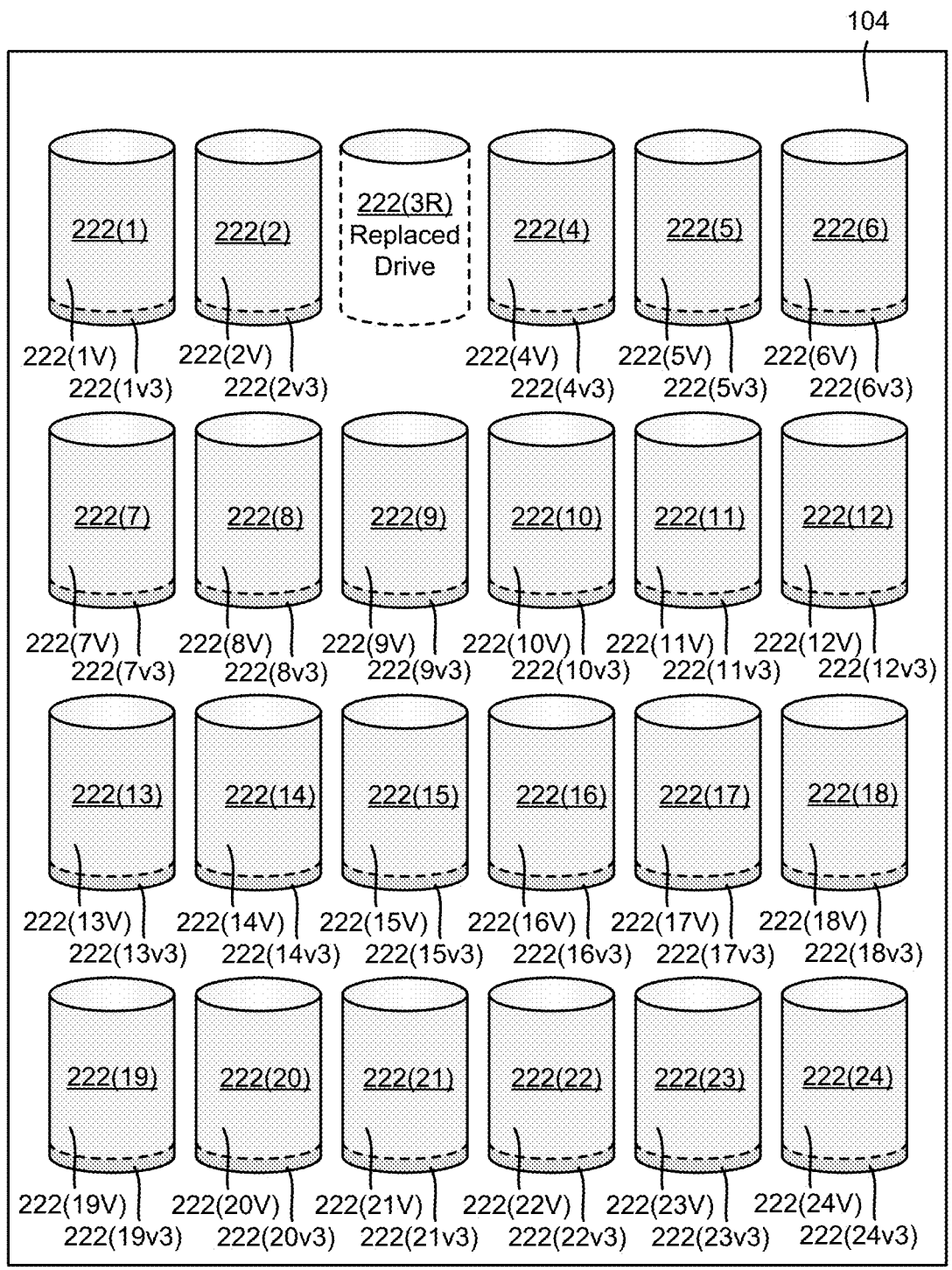

FIGS. 3-5 show a drive failure in the above distributed/virtual hot space capacity configuration, beginning at FIG. 3 where the drive 222(3) has failed as indicated by the crossed lines. When this occurs, the data that was on the physical drive 222(3) is reconstructed from the data on the other drives 222(1), 222(2) and 222(4)-222(24) in a known manner. Instead of having to write the reconstructed data to a single physical hot spare drive as in prior systems, as shown in FIG. 4 via the shaded areas 222(1v3), 222(2v3) and 222(4v3)-222(24v3) (where in general v3 refers to the virtually distributed reconstructed data from the failed disk 222(3)), the reconstructed data is written to the remaining twenty-three drives 222(1), 222(2) and 222(4)-222(24). Note that such distributed writing to multiple physical drives is more performant than writing to a single physical drive as in prior hot spare systems.

At some later time, the failed physical drive is replaced by the customer or the like, as shown via replaced drive 222(3R) in FIG. 5. When this occurs, the distributed reconstructed data (in its current state including any updates) is written back to the replacement drive 222(3R), and the distributed hot space capacity reclaimed for a next failure. This again corresponds to the general state of the storage devices 104 shown in FIG. 2, except that physical drive 222(3) has been replaced by replacement drive 222(3R), with any updates to the virtual disk data made via the data I/O source(s) 116 of FIG. 1.

As can be seen, the virtualized hot space capacity facilitates continuous, seamless use of the storage server as would a physical dedicated spare drive, yet the technology described herein provides for more efficient rebuilding/storing of the reconstructed data in a failure scenario (as multiple drives participate in the process), as well as additional benefits such as including increased virtual disk capacity, relatively higher performance by spreading the I/O operations over more drives (higher input/output operations per second because of having two more disks for I/O), more optimal usage of available drives as no drives are left out, and so on.

By way of another example shown in FIG. 6, consider that a server model provides a twelve×3.5 inch drive configuration with each drive being a 10 TB SAS (Serial Attached SCSI (Small Computer System Interface)) drive, a four×2.5 inch internal drive configuration, with each drive being a 3.84 TB SAS drive, and a four×2.5 inch rear drive configuration with each drive being a 3.84 TB SAS drive.

Thus, this model configuration comes with a mix of 3.5 inch and 2.5 inch drive slots and rotational drives can be used. Because the configuration has a mix of different form factor drives, a global hot spare is not normally used, and rather a dedicated hot spare is preferable to customers. Also, as the form factor of the drives is different, the customer needs to configure separate dedicated hot spares.

Further, in this example, a customer wants one virtual disk of RAID 10-type configuration with one dedicated hot spare drive, and one virtual disk of RAID 5-type configuration with one dedicated hot spare drive. The customer can thus specify a requirement of two differently configured RAID virtual disks, e.g., to choose one RAID type (RAID 10) on the 3.5 inch drives and the other (RAID 5) on the 2.5 inch drives. Note that in prior systems, two separate dedicated physical hot spare disks, one per each virtual disk, are needed.

Instead, based on the distributed hot space capacity technology described herein, as can be seen in FIG. 6 the server's disks 604 are configured as two virtual disks 662(A) and 662(B) for RAID 10 and RAID 5, respectively, with the darker shaded portions (not intended to be to scale) representing the hot space capacity distributed among each of the physical disks underlying the virtual disk portions (lighter shaded portions) in each of the drive types.

Similar to the above, in prior systems with a physical dedicated hot spare disk, the maximum capacity of the virtual disk A 662(A) is 50 TB spread across ten of the disks, (10×10 TB/2 for mirroring) with a hot spare disk of 10 TB. In such prior systems, the maximum capacity of the virtual disk B 662(B) is 23 TB spread across seven disks (3.84 TB×6 disks, with approximately 1 disk for the parity) with one physical hot spare disk of 3.84 TB.

In contrast, with distributed hot space capacity as described herein, the maximum capacity of virtual disk A 662(A) is 55 TB spread across all twelve of the disks, ($^{11}/_{12}\times12\times10$ TB/2 for mirroring) with a distributed virtual hot space (corresponding to a hot spare disk) of 10 TB. With distributed hot space capacity, the maximum capacity of virtual disk B 662(B) is 23.52 TB spread across eight disks (3.84 TB×$^{7}/_{8}$×7 disks, with approximately 1 disk for the parity) with a distributed virtual hot space (corresponding to a hot spare disk) of 3.84 TB capacity (3.84 TB×$^{1}/_{8}$×8 disks).

For purposes of brevity herein, another failure scenario is not described with respect to the model represented in FIG. 6, however it is noted that faster rebuilds again result from more disks participating in the data reconstruction and storage of the reconstructed data. As noted above, virtual disk capacity is increased in both RAID 5 and RAID 10 configurations, and higher performance results from having I/O spread across more disks (more input/output operations per second). For the RAID 10 configuration, more optimal usage is available (all twelve 10 TB disks can be used ($^{11}/_{12}$ for the virtual disk and $^{1}/_{12}$ for the hot space capacity)), rather than having only eleven used with a physical dedicated hot spare disk (ten for the virtual disk, one for the dedicated hot spare disk, and one disk/slot unused because of the RAID 10 even number requirement).

Figure 7:
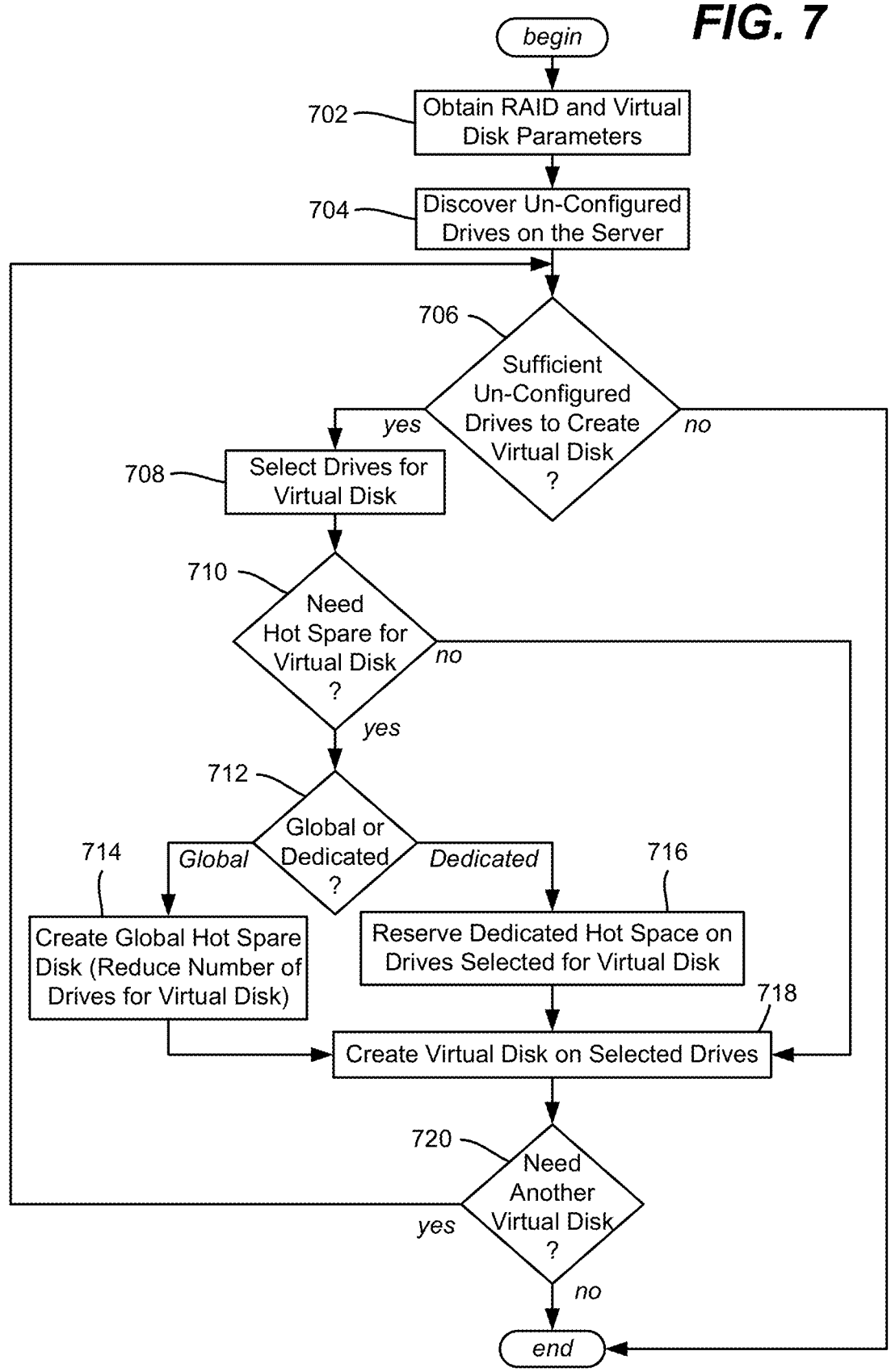
FIG. 7 is a flow diagram showing example operations for configuring a RAID virtual device, including when using dedicated distributed hot space on the drives selected for the virtual disk, in accordance with various aspects and implementations of the subject disclosure.

FIG. 7 is a flow diagram of example operations showing how customer interaction with a user interface to a RAID controller coupled to or incorporated into a data storage server can be used with the technology described herein. Operation 702 represents obtaining RAID and virtual disk parameters, e.g., as planned by a customer/user (e.g., an administrator) and submitted into the system as requirements. Once obtained, operation 704 discovers the un-configured drives on the server.

Operation 706 represents evaluating whether there are sufficient un-configured drives to create the virtual disk; if not, the process is ended, with, for example, a prompt or the like (not explicitly shown in FIG. 7) explaining the problem to the administrator. Otherwise, operation 708 selects the drives for the virtual disk, which can be manually input or automatically selected by the server, or a combination of both.

Operation 710 checks whether the administrator has indicated (e.g., via a user interface selection box or the like) a need for a hot spare. If not, the process branches to operation 718 to create the virtual disk on the selected drives, which would be all selected drives in this situation.

If instead a hot spare is needed, operation 712 evaluates whether the user has indicated (e.g., via the selection box) whether a global hot spare is requested, or dedicated distributed hot space (corresponding to a dedicated hot spare physical drive) is specified. If global, operation 714 creates the global hot spare (physical) disk, which reduces the number of drives available for the virtual disk. Note that a global hot spare may have previously been created for another virtual disk in the server, in which event operation 714 can couple the virtual disk to-be-created to the existing global hot spare drive. Further note that a global hot spare can exist in conjunction with a distributed hot space virtual drive as described herein.

If instead at operation 712 dedicated hot space capacity was specified, operation 716 reserves the dedicated hot space on the drives selected for the virtual disk. Note that this can be a mathematical reservation of the capacity with appropriate LBAs, such as used by the RAID controller logic described below with reference to operation 718.

More particularly, at operation 718, the virtual disk and any global hot spare or distributed hot space configuration can be implemented in RAID controller logic as shown below (at Operation 3):

---

Operation 1: Select RAID type
Operation 2: Select Un-Configured disks
   Return ("N" number of Un-Configured disks)
Operation 3: Hot Spare selection
   {
   if (hot spare == global hot spare)
   Execute ← Disk selection for global hot spare
   Return (Remaining "N-1" Un-configured disks to virtual disk creation)
   else if (hot spare == distributed hot spare)
   hot spare capacity (H) ← Capacity of 1 Un-configured disk (C)
   Un-configured Capacity (UC) ← (N * C) − H
   Un-configured Capacity per Disk (UCD) ← UC/N
   Identification of address locations (LBA) for UCD
   Return (UC, UCD and LBA for virtual disk creation)
   else if (hot spare == None)
   Return (All "N" Un-configured disks to virtual disk creation)
   endif
   }
Operation-4: Virtual disk information update
Operation-5: Virtual disk Creation
   Creates virtual disks based on UC, UCD, N, N-1 and address location of disk capacity.

---

It should be noted that for even more fault tolerance, the distributed dedicated hot space capacity corresponding to more than one hot spare drive can be specified via the user interface. In other words, the administrator can reserve dedicated hot space capacity corresponding to any practical multiple of dedicated hot spare drives. For example, in the above logic the administrator-specified hot spare capacity (H) can be two times the capacity of an un-configured disk (rather than one as shown); if so, in FIG. 2 the darker shaded portion (although actually not shown to scale) would double in size to represent 2/24 of the drive capacity, with 22/24 used for the virtual disk. Similarly the hot spare capacity would triple for an administrator-specified hot spare capacity of three times a physical disk's capacity, and so on.

Operation 720 repeats the process if another virtual disk is specified as needed by returning to operation 706. The process ends when virtual disk creation as described herein is finished, or if insufficient un-configured drives are available as determined at operation 706.

Figure 8:
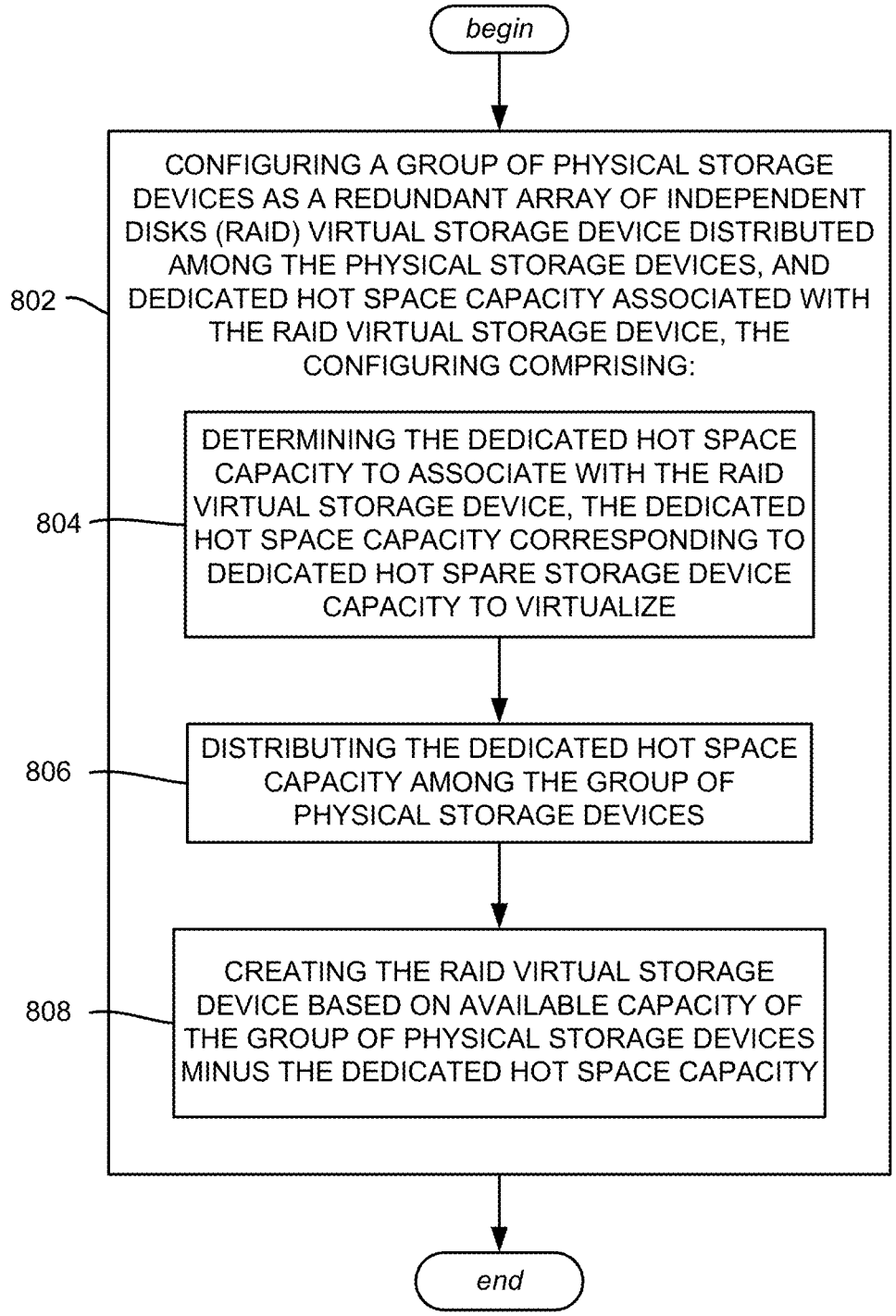
FIG. 8 is an example flow diagram showing example operations related to configuring a group of physical storage devices as a RAID virtual storage device distributed among the physical storage devices, with dedicated hot space capacity associated with the RAID virtual storage device, in accordance with various aspects and implementations of the subject disclosure.

One or more aspects can be embodied in a system, such as represented in FIG. 8, and for example can comprise a memory that stores computer executable components and/or operations, and a processor that executes computer executable components and/or operations stored in the memory. Example operations can comprise operation 802, which represents configuring a group of physical storage devices as a redundant array of independent disks (RAID) virtual storage device distributed among the physical storage devices, and dedicated hot space capacity associated with the RAID virtual storage device. The configuring can comprise operation 804, which represents determining the dedicated hot space capacity to associate with the RAID virtual storage device, the dedicated hot space capacity corresponding to dedicated hot spare storage device capacity to virtualize, operation 806, which represents distributing the dedicated hot space capacity among the group of physical storage devices; and operation 808, which represents creating the RAID virtual storage device based on available capacity of the group of physical storage devices minus the dedicated hot space capacity.

Further operations can comprise obtaining, via a user interface, quantity data representing a multiple of one or more dedicated hot spare storage devices to virtualize, and wherein determining the dedicated hot space capacity comprises computing the dedicated hot space capacity based on a number of the physical storage devices in the group and the quantity data.

Creating the RAID virtual storage device can comprise sending virtual disk creation information to a RAID controller. The virtual disk creation information can comprise at least one of: a number of the storage devices in the group, un-configured capacity data, un-configured capacity per disk data, or logical block address data.

The group of physical storage devices can comprise hard disk drives. The group of physical storage devices can comprise solid state drives.

Further operations can comprise recovering from a failure of a failed storage device in the group, comprising reconstructing data of the failed storage device from data of non-failed storage devices in the group to obtain reconstructed data, and distributing the reconstructed data to the dedicated hot space capacity.

Creating the RAID virtual storage device can comprise generating, via a RAID controller, an array of logical block address values for the virtual storage device, which map to physical logical block address values on the physical storage devices. The array can be a first array of first logical block address values for the virtual storage device, which map to first physical logical block address values on the physical storage devices, and further operations can comprise generating a second array comprising second logical block address values for the dedicated hot space capacity, which map to second physical logical block address values on the physical storage devices.

The virtual storage device can comprise a RAID10-type virtual storage device. The virtual storage device can comprise a RAID5-type virtual storage device.

The virtual storage device can be a first virtual storage device in a model configuration, and the model configuration further can comprise a second virtual storage device.

Figure 9:
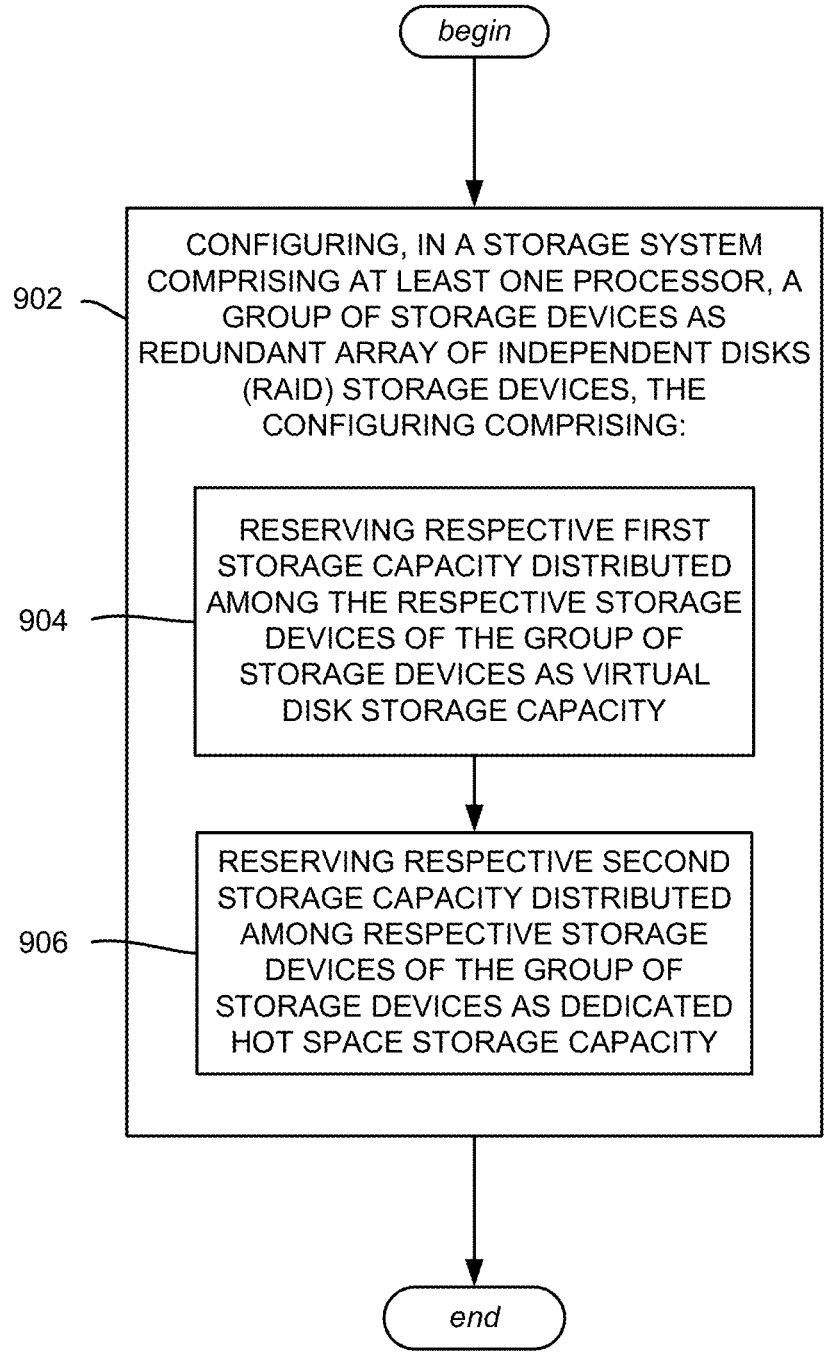
FIG. 9 is an example flow diagram showing example operations related to configuring a group of physical storage devices as a RAID virtual storage device, including reserving storage capacity as virtual disk space and hot space capacity distributed among the physical storage devices, in accordance with various aspects and implementations of the subject disclosure.

One or more example aspects, such as corresponding to example operations of a method, are represented in FIG. 9. Operation 902 represents configuring, in a storage system comprising at least one processor, a group of storage devices as redundant array of independent disks (RAID) storage devices. The configuring can comprise reserving respective first storage capacity distributed among the respective storage devices of the group of storage devices as virtual disk storage capacity (operation 904), and reserving respective second storage capacity distributed among respective storage devices of the group of storage devices as dedicated hot space storage capacity (operation 906).

Aspects can comprise obtaining, via a user interface, distributed hot space data representing the dedicated hot space storage capacity corresponding to a multiple of one or more hot spare storage devices, and determining the dedicated hot space storage capacity to reserve based on the distributed hot space data representing the hot spare storage device quantity.

Reserving the first storage capacity and the reserving the second storage capacity can comprise sending configuration information to a RAID controller, the configuration information corresponding to at least one of: a number of the storage devices in the group, a number of the storage devices in the group to virtualize as distributed hot space storage capacity, remaining un-configured capacity, remaining un-configured capacity per disk, or logical block address data.

Aspects can comprise receiving the configuration information at the RAID controller, and generating, via the RAID controller based on the configuration information, a first array of logical block address values for the virtual storage device, and a second array of logical block address values for the distributed hot space capacity.

Aspects can comprise recovering from a failure of a failed storage device in the group, comprising reconstructing data of the failed storage device from data of non-failed storage devices in the group to obtain reconstructed data, and distributing the reconstructed data among the dedicated hot space storage capacity.

Figure 10:
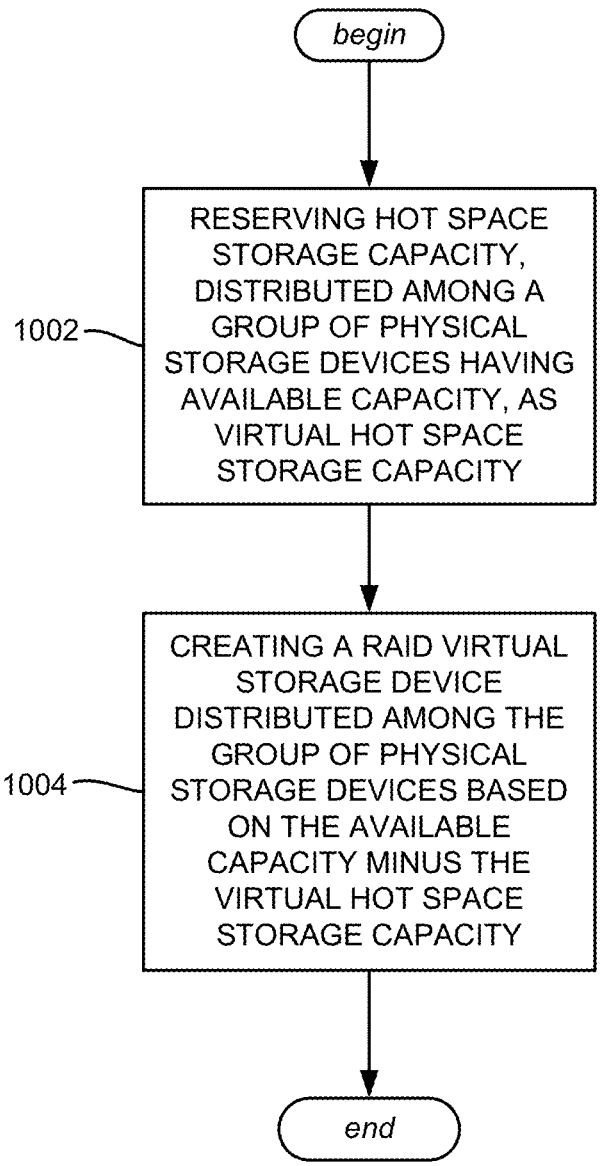
FIG. 10 is an example flow diagram showing example operations related to reserving distributed hot space capacity on storage devices, and creating a RAID virtual disk on the remaining storage device capacity, in accordance with various aspects and implementations of the subject disclosure.

FIG. 10 summarizes various example operations, e.g., corresponding to a machine-readable storage medium, comprising executable instructions that, when executed by a processor of a data storage system comprising a redundant array of independent disks (RAID) controller, facilitate performance of operations. Operation 1002 represents reserving hot space storage capacity, distributed among a group of physical storage devices having available capacity, as virtual hot space storage capacity. Operation 1004 represents creating a RAID virtual storage device distributed among the group of physical storage devices based on the available capacity minus the virtual hot space storage capacity.

Further operations can comprise mapping first logical block addresses to first physical portions of physical hard drives underlying the RAID virtual storage device, and mapping second logical block addresses to second physical portions of the physical hard drives underlying the hot space storage capacity.

Further operations can comprise recovering from a failure of a failed physical storage device in the group, comprising reconstructing data of the failed physical storage device from data of non-failed storage devices in the group to obtain reconstructed data, and distributing the reconstructed data among the hot space storage capacity.

As can be seen, described herein is a technology that facilitates the use of what was a dedicated hot spare disk to instead be utilized as part of virtual disk configuration, with the disk capacity reserved for the hot spare disk included in the virtual disk. The technology thus replaces the existing dedicated hot spare drive with virtualized, distributed hot space capacity, thereby utilizing the storage device resource that is otherwise reserved for the unused hot spare disk in real time, while still providing the hot spare capacity for fault tolerance in the event of a drive failure. This further speeds the rebuilding process, affecting overall performance relative to the rebuild of a physical hot spare disk.

The technology reduces the amount of (mostly) unused redundant hardware by virtualizing hot spare disks in servers, which would otherwise draw power from the server and contribute to an overall higher temperature in the datacenter/large server farm. The technology avoids significant inefficiency when there are hundreds or even thousands of servers in a datacenter. This benefits customers by providing more optimal usage of datacenter resources, including more effective disk utilization, improved performance, reduced power consumption and the related cooling needs.

The technology leverages performance of what was an unused hot spare disk, and eliminates the waste of physical slot space of the server for the unused hot spare disk. The technology improves the cost-to-capacity ratio (cost per gigabyte) and cost-to-performance ratio (cost per I/O operations per second), particularly with the servers that provide an even number disks when a mirror type of RAID for a virtual disk type is specified.

Figure 11:
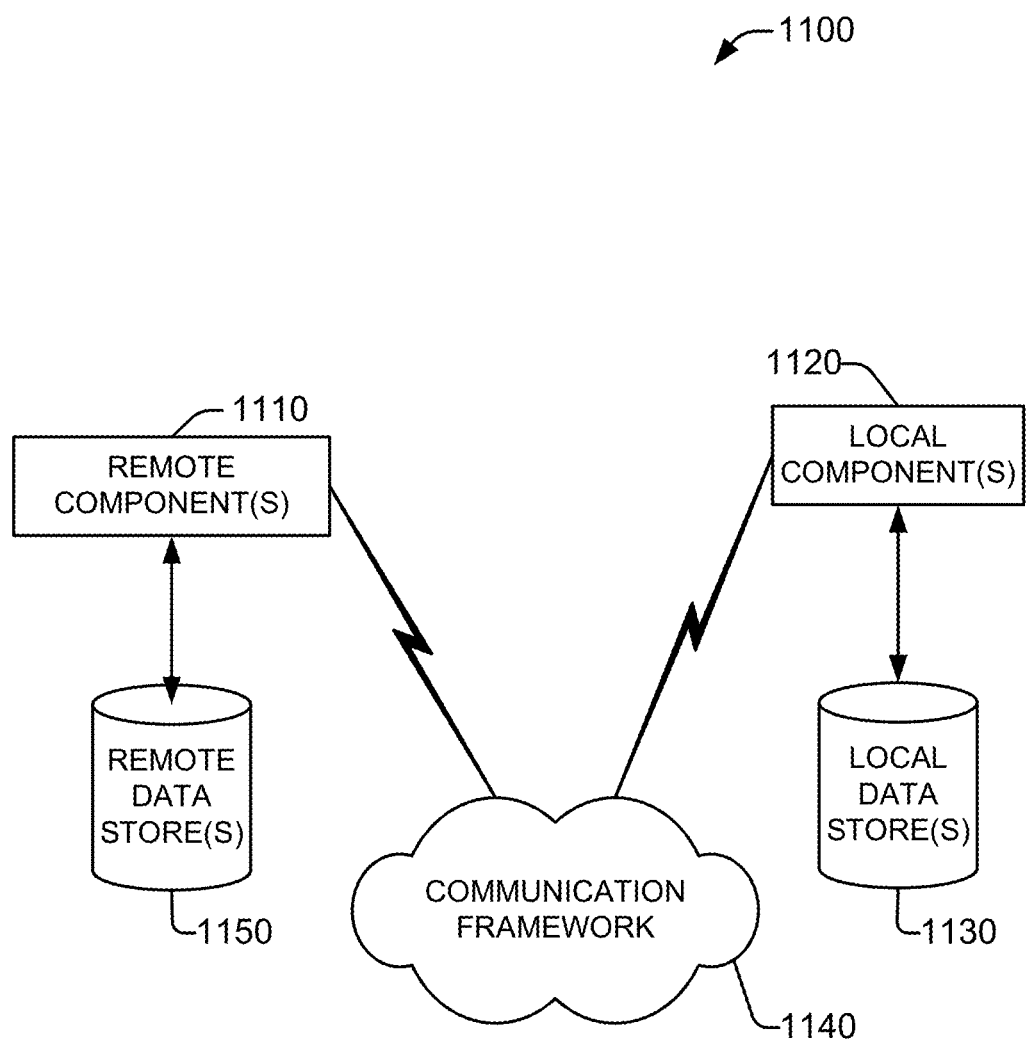
FIG. 11 is a block diagram representing an example computing environment into which aspects of the subject matter described herein may be incorporated.

FIG. 11 is a schematic block diagram of a computing environment 1100 with which the disclosed subject matter can interact. The system 1100 comprises one or more remote component(s) 1110. The remote component(s) 1110 can be hardware and/or software (e.g., threads, processes, computing devices). In some embodiments, remote component(s) 1110 can be a distributed computer system, connected to a local automatic scaling component and/or programs that use the resources of a distributed computer system, via communication framework 1140. Communication framework 1140 can comprise wired network devices, wireless network devices, mobile devices, wearable devices, radio access network devices, gateway devices, femtocell devices, servers, etc.

The system 1100 also comprises one or more local component(s) 1120. The local component(s) 1120 can be hardware and/or software (e.g., threads, processes, computing devices). In some embodiments, local component(s) 1120 can comprise an automatic scaling component and/or programs that communicate/use the remote resources 1110 and 1120, etc., connected to a remotely located distributed computing system via communication framework 1140.

One possible communication between a remote component(s) 1110 and a local component(s) 1120 can be in the form of a data packet adapted to be transmitted between two or more computer processes. Another possible communication between a remote component(s) 1110 and a local component(s) 1120 can be in the form of circuit-switched data adapted to be transmitted between two or more computer processes in radio time slots. The system 1100 comprises a communication framework 1140 that can be employed to facilitate communications between the remote component(s) 1110 and the local component(s) 1120, and can comprise an air interface, e.g., Uu interface of a UMTS network, via a long-term evolution (LTE) network, etc. Remote component(s) 1110 can be operably connected to one or more remote data store(s) 1150, such as a hard drive, solid state drive, SIM card, device memory, etc., that can be employed to store information on the remote component(s) 1110 side of communication framework 1140. Similarly, local component(s) 1120 can be operably connected to one or more local data store(s) 1130, that can be employed to store information on the local component(s) 1120 side of communication framework 1140.

Figure 12:
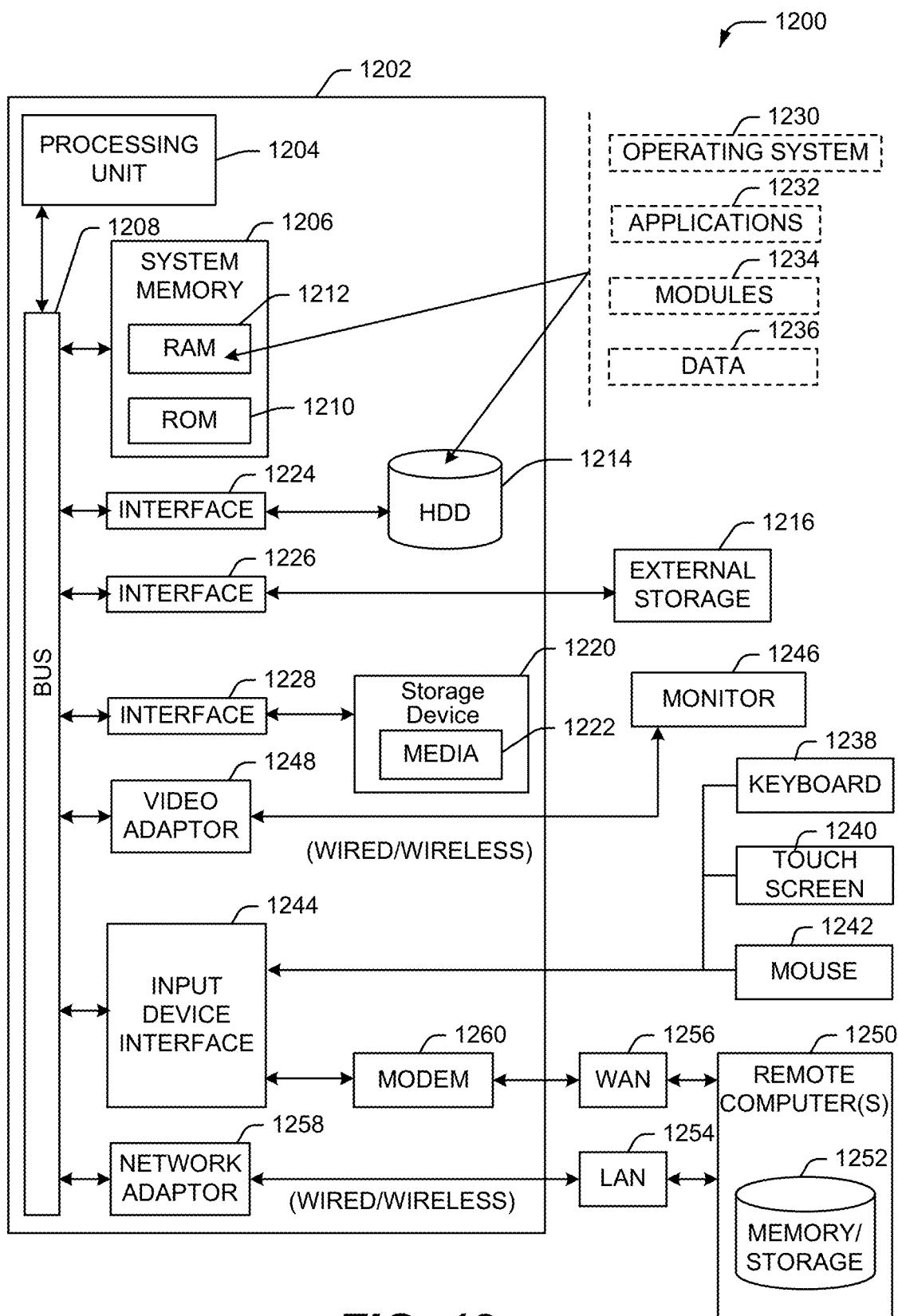
FIG. 12 depicts an example schematic block diagram of a computing environment with which the disclosed subject matter can interact/be implemented at least in part, in accordance with various aspects and implementations of the subject disclosure.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), and can include one or more external storage devices 1216 (e.g., a magnetic floppy disk drive (FDD) 1216, a memory stick or flash drive reader, a memory card reader, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214.

Other internal or external storage can include at least one other storage device 1220 with storage media 1222 (e.g., a solid state storage device, a nonvolatile memory device, and/or an optical disk drive that can read or write from removable media such as a CD-ROM disc, a DVD, a BD, etc.). The external storage 1216 can be facilitated by a network virtual machine. The HDD 1214, external storage device(s) 1216 and storage device (e.g., drive) 1220 can be connected to the system bus 1208 by an HDD interface 1224, an external storage interface 1226 and a drive interface 1228, respectively.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1194 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
a processor, and
a memory that stores executable instructions that, when executed by the processor, facilitate performance of operations, the operations comprising:
    selecting a group of physical storage devices for configuration as a redundant array of independent disks (RAID) virtual storage device;
    determining a dedicated hot space capacity to associate with the RAID virtual storage device; and
    configuring the group of physical storage devices as the RAID virtual storage device with the dedicated hot space capacity, comprising:
        distributing the dedicated hot space capacity amongst first portions of respective devices of the group of physical storage devices; and
        distributing the RAID virtual storage device amongst second portions of the respective.

2. The system of claim 1, wherein the operations further comprise obtaining, via a user interface, quantity data representing a multiple of one or more dedicated hot spare storage devices to virtualize, and wherein determining the dedicated hot space capacity comprises computing the dedicated hot space capacity based on a number of the physical storage devices in the group and the quantity data.

3. The system of claim 1, wherein the configuring further comprises creating the RAID virtual storage device with the dedicated hot space capacity in association with sending virtual disk creation information to a RAID controller.

4. The system of claim 3, wherein the virtual disk creation information comprises at least one of: a number of the physical storage devices in the group, un-configured capacity data, un-configured capacity per disk data, or logical block address data.

5. The system of claim 3, wherein the virtual disk creation information identifies the first portions of the respective devices for usage as the dedicated hot space capacity and the second portions of the respective devices for usage as the RAID virtual storage device.

6. The system of claim 1, wherein the group of physical storage devices comprises hard disk drives.

7. The system of claim 1, wherein the group of physical storage devices comprises solid state drives.

8. The system of claim 1, wherein the operations further comprise recovering from a failure of a failed storage device in the group, comprising reconstructing data of the failed storage device from data of non-failed storage devices in the group to obtain reconstructed data, and distributing the reconstructed data to the dedicated hot space capacity included in first portions of the respective devices.

9. The system of claim 1, wherein the configuring further comprises generating, via a RAID controller, an array of logical block address values for the RAID virtual storage device which map to physical logical block address values on the respective devices.

10. The system of claim 9, wherein the array is a first array of first logical block address values for the RAID virtual storage device, which map to first physical logical block address values on the second portions of the respective devices, and wherein the operations further comprise generating a second array comprising second logical block address values for the dedicated hot space capacity, which map to second physical logical block address values on the first portions of the respective devices.

11. The system of claim 1, wherein the RAID virtual storage device comprises a RAID10-type virtual storage device.

12. The system of claim 1, wherein the RAID virtual storage device comprises a RAID5-type virtual storage device.

13. A method comprising:
configuring, in a storage system comprising at least one processor, a group of physical storage devices as redundant array of independent disks (RAID) storage devices, the configuring comprising:
reserving first storage capacity distributed amongst first portions of respective storage devices of the group of physical storage devices as virtual disk storage capacity; and
reserving second storage capacity distributed amongst second portions of the respective storage devices as dedicated hot space storage capacity.

14. The method of claim 13, further comprising obtaining, via a user interface, distributed hot space data representing the dedicated hot space storage capacity corresponding to a multiple of one or more hot spare storage devices, and determining the dedicated hot space storage capacity to reserve based on the distributed hot space data representing the hot spare storage device quantity.

15. The method of claim 13, wherein the reserving the first storage capacity and the reserving the second storage capacity comprises sending configuration information to a RAID controller, the configuration information corresponding to at least one of: a number of the physical storage devices in the group, a number of the physical storage devices in the group to virtualize as distributed hot space storage capacity, remaining un-configured capacity, remaining un-configured capacity per disk, or logical block address data.

16. The method of claim 15, further comprising receiving the configuration information at the RAID controller, and generating, via the RAID controller based on the configuration information, a first array of logical block address values for the virtual disk storage capacity, and a second array of logical block address values for the dedicated hot space storage capacity.

17. The method of claim 13, further comprising recovering from a failure of a failed storage device in the group, comprising reconstructing data of the failed storage device from data of non-failed storage devices in the group to obtain reconstructed data, and distributing the reconstructed data among the dedicated hot space storage capacity included in the second portions of the respective storage devices.

18. A non-transitory machine-readable storage medium, comprising executable instructions that, when executed by a processor of a data storage system comprising a redundant array of independent disks (RAID) controller, facilitate performance of operations, the operations comprising:
reserving hot space storage capacity, distributed amongst first portions of respective storage devices included in a group of physical storage devices having available capacity, as virtual hot space storage capacity; and
creating a RAID virtual storage device distributed amongst second portions of the respective devices excluding the first portions.

19. The non-transitory machine-readable storage medium of claim 18, wherein the operations further comprise mapping first logical block addresses corresponding to the RAID virtual storage device to the second portions, and mapping second logical block addresses corresponding to the virtual hot space storage capacity to the first portions.

20. The non-transitory machine-readable storage medium of claim 18, wherein the operations further comprise recovering from a failure of a failed physical storage device in the group, comprising reconstructing data of the failed physical storage device from data of non-failed storage devices in the group to obtain reconstructed data, and distributing the reconstructed data among the hot space storage capacity included in the first portions of the respective storage devices.

* * * * *